United States Patent [19]

Hsu

[11] Patent Number: 4,598,690
[45] Date of Patent: Jul. 8, 1986

[54] COLLAPSIBLE CAMP STOVE

[76] Inventor: Wen Y. Hsu, No. 6, Lane 129, Fu-Kang Street, Shin Lin District, Taipei, Taiwan

[21] Appl. No.: 721,459

[22] Filed: Apr. 9, 1985

Related U.S. Application Data

[63] Continuation-in-part of Ser. No. 628,493, Jul. 6, 1984, Pat. No. 4,548,192.

[51] Int. Cl.$^4$ ............................................. F24B 3/00
[52] U.S. Cl. ............................... 126/25 R; 126/9 R; 126/29; 126/38
[58] Field of Search ............... 126/25 R, 1 R, 25 A, 126/29, 30, 9 R, 9 B, 38, 37 B, 59

[56] References Cited

U.S. PATENT DOCUMENTS

| | | | |
|---|---|---|---|
| 1,084,509 | 1/1914 | Wamble | 126/29 |
| 1,096,002 | 5/1914 | Stopple | 126/29 |
| 1,626,035 | 4/1927 | Hanson | 126/38 |
| 2,556,365 | 7/1951 | McKnight, Jr. | 126/38 X |
| 2,852,016 | 9/1958 | Weatherwax | 126/38 X |
| 4,457,290 | 7/1984 | Edwards | 126/25 A X |
| 4,508,096 | 4/1985 | Slattery | 126/38 X |

Primary Examiner—Larry Jones
Attorney, Agent, or Firm—Lowe Price LeBlanc Becker & Shur

[57] ABSTRACT

The present invention relates to a collapsible camp stove and in particular to one comprising a folding casing having two side panels each provided at the inner surface with an upper rail and a lower rail and formed at the top with notches for supporting roasting rods, four leg members engageable with the bottom of the folding casing, two grips engageable with two sides of the folding casing, a grate disposed in the folding casing for supporting burning fuel within and above the inside bottom surface of the folding casing, a roasting frame adapted to be supported by the upper rails or the lower rails of the side panels of the folding casing for supporting food items at a predetermined height above the burning fuel, and a plurality of roasting rods adapted to be supported in the notches of the side panels of the folding casing.

1 Claim, 8 Drawing Figures

COLLAPSIBLE CAMP STOVE

CROSS REFERENCE TO RELATED APPLICATION

The present invention is a continuation-in-part of application Ser. No. 628,493, filed July 6, 1984, now U.S. Pat. No. 4,548,192, issued Oct. 22, 1985.

BACKGROUND OF THE INVENTION

1. Field of the Invention

This invention relates specifically to a collapsible camp stove employing charcoal, firewood or the like as fuel.

2. Description of the Prior Art

As a result of rapid population growth, more and more people are engaging in camping as a leisure activity to relieve day to day stress. Accordingly, there is a need for a camp stove. However, most camp stoves are of a fixed, rigid configuration and inconviently handled especially when used outdoors.

It is, therefore, an object of the present invention to provide a collapsible camp stove which may obviate the above-mentioned drawback of conventional camp stoves.

SUMMARY

The present invention concerns a collapsible camp stove comprising a folding casing having two side panels each formed at the top with notches, four leg members engageable with the bottom of the folding casing, two grips respectively mounted on two outer sides of the folding casing, a grate disposed in the folding casing for supporting burning fuel, a roasting frame disposed in the folding casing for supporting food items at a predetermined height above the burning fuel, and a plurality of roasting rods adapted to be received in the notches of the side panels of the folding casing.

It is the primary object of the present invention to provide a collapsible camp stove which can be carried about.

It is another object of the present invention to provide a collapsible camp stove which is convenient to use.

It is still another object of the present invention to provide a collapsible camp stove which is lightweight.

It still another object of the present invention to provide a collapsible camp stove which is easy to assemble.

It is still a further object of the present invention to provide a collapsible camp stove which is of simple construction.

It is a further object of the present invention to provide a collapsible camp stove which can be produced with lower labor costs.

With the above and other objects in view, as will appear in those skilled in the art from the present disclosure which are novel over the prior art and which are not claimed in any separate application.

In the accompanying drawings, in which certain mode of carrying out the present invention is shown for illustrative purpose:

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
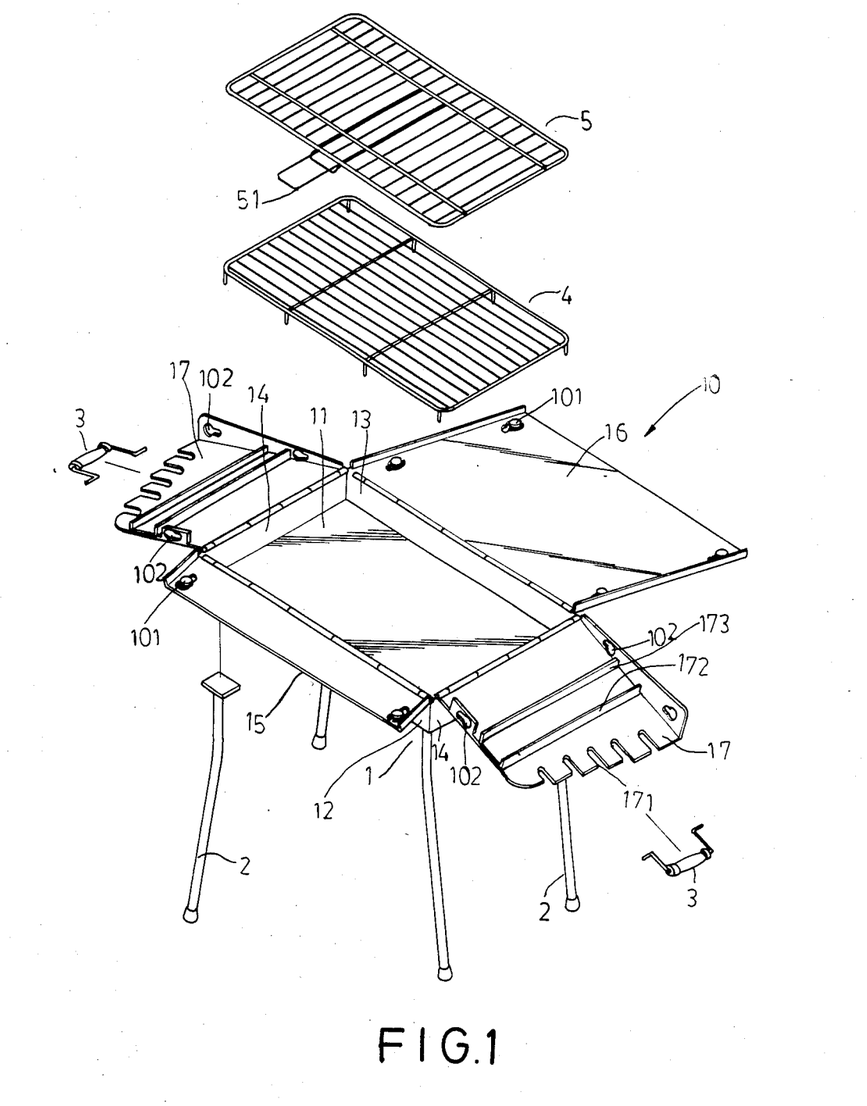
FIG. 1 is an exploded view of a collapsible camp stove according to a preferred embodiment of the present invention.
Figure 2:
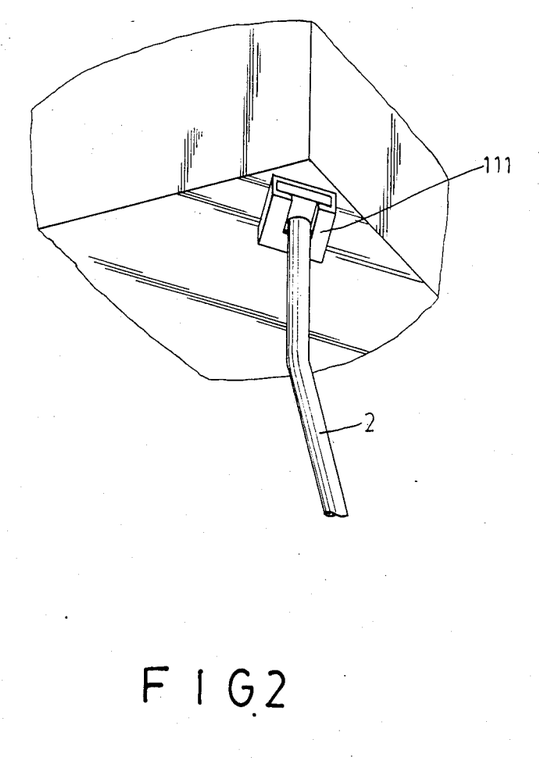
FIG. 2 is an enlarged fragmentary view showing the connection between the leg member and the bottom of the folding casing.
Figure 3:
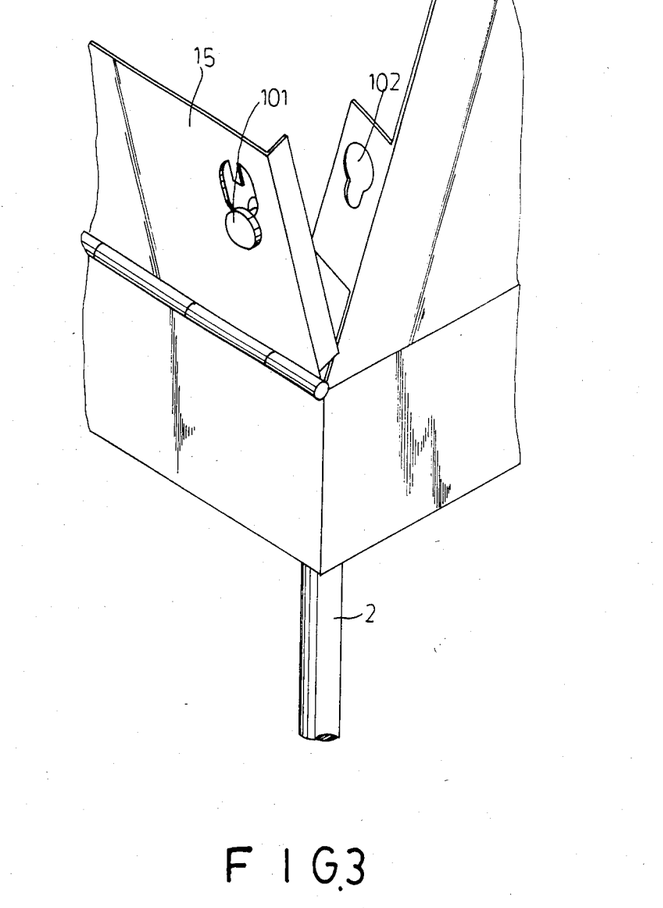
FIG. 3 is an enlarged fragmentary view showing the connection between the front panel and the side panel.
Figure 4:
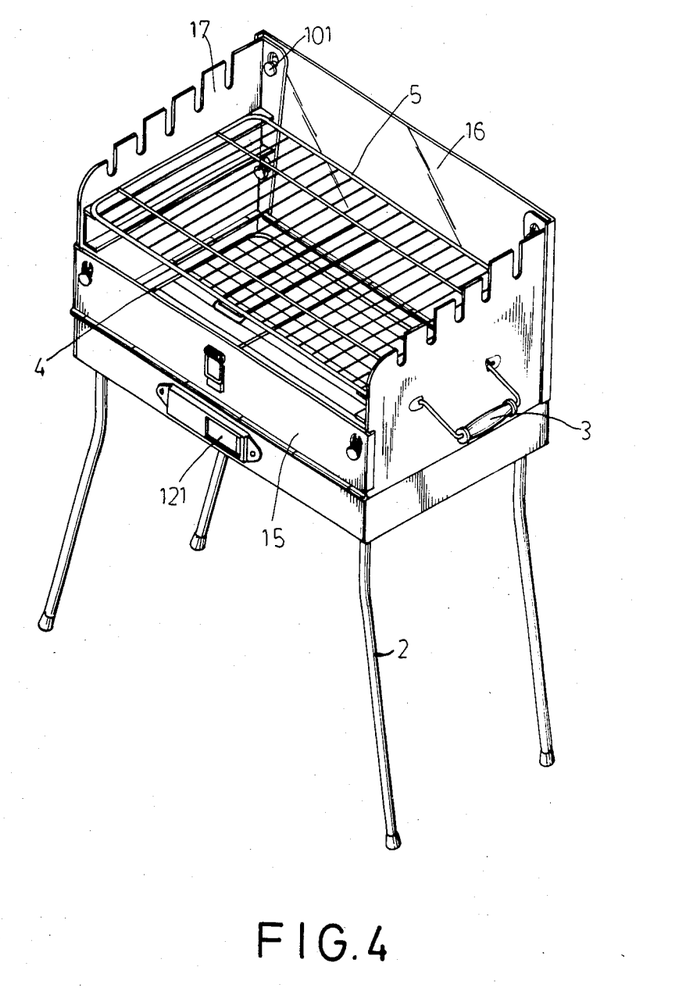
FIG. 4 shows the using state of the collapsible camp stove.

With referene to the drawings and in particular to FIGS. 1 and 2 thereof, the collapsible camp stove according to the present invention is shown having a folding casing 10. The folding casing 10 includes a rectangular receptacle 1 having bottom plate 11, a front plate 12 rising from the bottom plate 11, a rear plate 13 rising from the bottom plate 11, and two side plates 14 rising from the bottom plate 11 and connecting each of the complemental ends of the front plate 12 and the rear plate 13 together. The front plate 12 is fitted with an air baffle 121 (shown in FIG. 4) for controlling air flow entering into the folding casing 10 for combustion of fuel therein. The bottom plate 11 is provided at the lower surface with four socket members 111 (shown in FIG. 2). A front panel 15 and a rear panel 16 are respectively hinged to the upper edges of the front plate 12 and the rear plate 13. The front panel 15 is formed at each vertical side with a hole in which is slidably mounted a fastener 101, while the rear panel 16 is formed at each vertical side with two holes in each of which is slidably mounted a fastener 101. Two side panels 17 are respectively hinged to the upper edges of the two side plates 14. Each side panel 17 is formed at the top with five notches 171 and at the vertical side with a flange having a locking hole 102 which is positioned such that the side panels 17 are connected when put together respectively with the front panel 15 and the rear panel 16 and the fasteners 101 slidably mounted in the holes of the front panel 15 and the rear panel 16 are moved downwards, and the side panels 17 disconnect from the front panel 15 and the rear panel 16 when the fasteners 101 slidably mounted in the holes of the front panel 15 and the rear panel 16 are moved upwards allowing the folding casing 10 to be folded into a compact case. The side panel 17 is further provided with an upper rail 172 and a lower rail 173.

Figure 5:
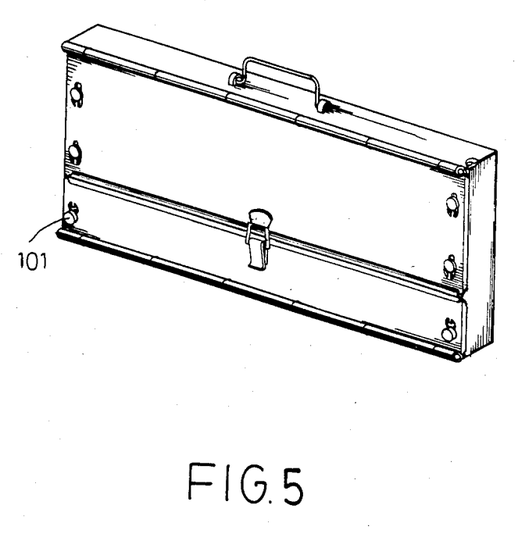
FIG. 5 shows the collapsed state of the collapsible camp stove.
Figure 6:
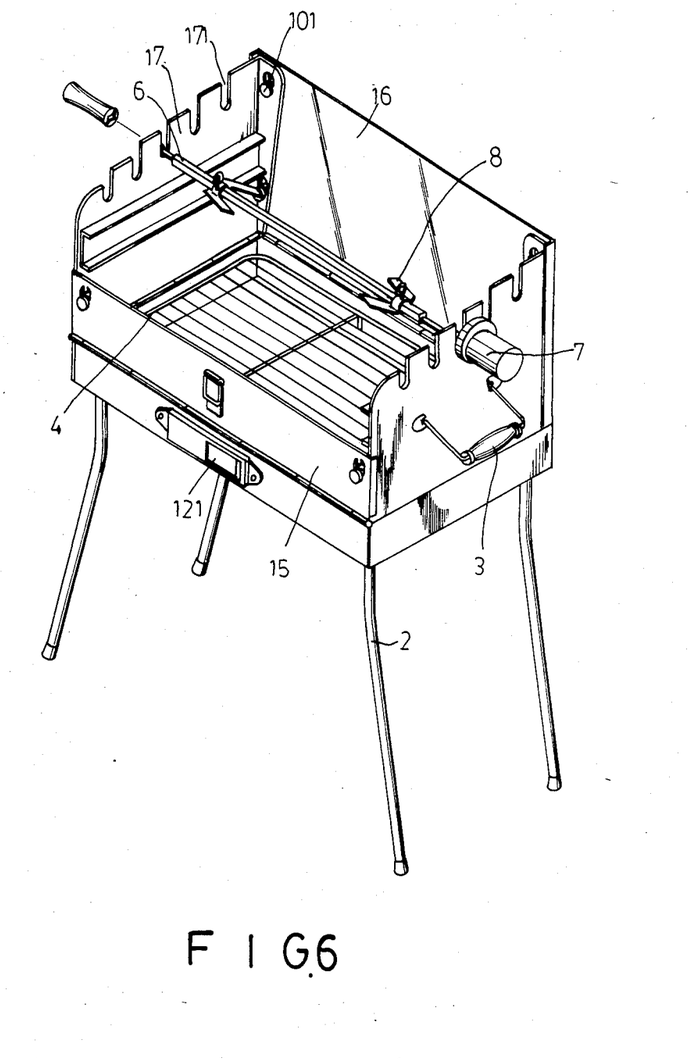
FIG. 6 shows that a roasting rod is supported by the notches of the side panels.
Figure 7:
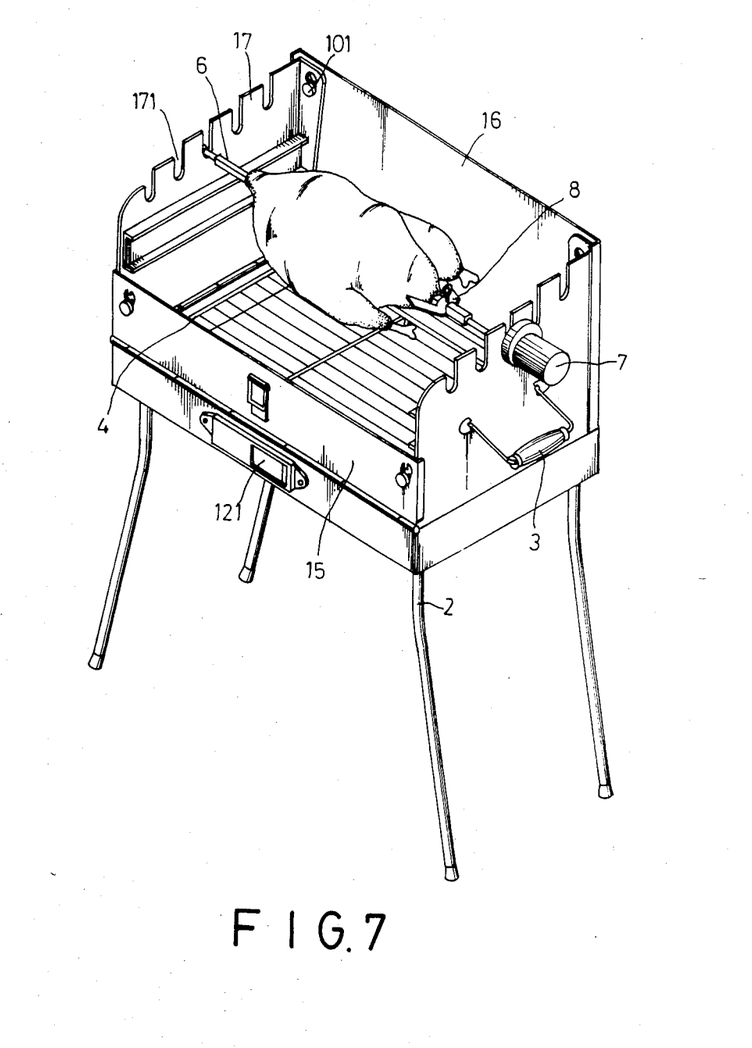
FIG. 7 shows a first application of the collapsible camp stove.

Four leg members 2 are each engageable with one of the four socket members 111 of the folding casing 10. On the outer surface of each side panel 17 is detachably mounted a grip 3. A grate 4 is disposed in the folding casing 10 for supporting burning fuel (not shown)

within and above inside bottom surface of the receptacle 1 of the folding casing 10. A roasting frame 5 is provided for supporting food items (shown in FIG. 8) at a predetermined height above the burning fuel (not shown). The roasting frame 5 has a holding member 51 movably mounted thereto thereby enabling the holding member 51 to be moved out to act as a handle, and is designed so that it can be supported by the upper rails 172 or lower rails 173 of the side panels 17. Two laterally spaced pairs of cooperating fastening devices are secured to outer surface of the front panel 15 and the outer surface of the rear panel 16, respectively, to permit a securement of the side panels 17, the front panel 15 and the rear panel 16 in closed position over the open top of the receptacle 1 (see FIG. 5). Further, a plurality of roasting rods 6 (only one roasting rod 6 is shown) are provided for holding food item. The roasting rod 6 is adapted to be supported by the notches 171 of the side panels 17 and is engageable with a motor 7 at one end so that it will be rotated when the motor 7 is switched on. On the length of the roasting rod 6 there are two fork members 8 for holding the food in position (as shown in FIG. 6).

To assemble the collapsible camp stove according to the present invention, first turn up the front panel 15, the rear panel 16 and the two side panels 17. Engage the fasteners 101 of the front panel 15 and the rear panel 16 with corresponding locking holes 102 of the side panels 16. Connect the leg members 2 with the socket members 111 provided on the bottom of the folding casing 10. Place the grate 4 in the receptacle 11 of the folding casing 10. Attach the grips 3 to the outer surface of the side panels 16. Place several pieces of charcoal or the like (not shown) on the grate 4 and set them on fire. The collapsible camp stove is now in condition for use.

Figure 8:
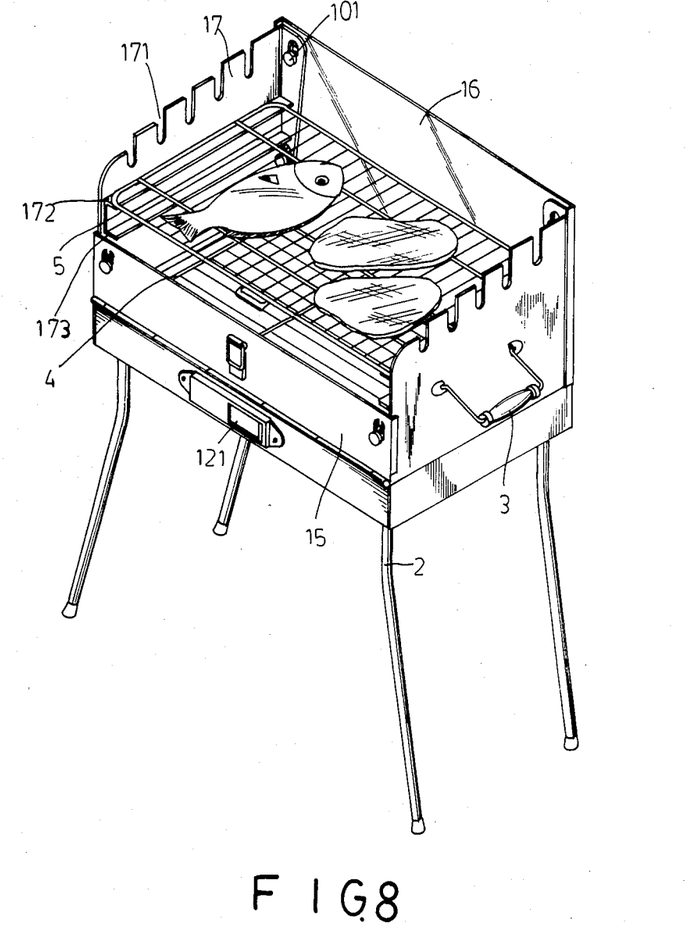
FIG. 8 shows a second application of the collapsible camp stove.

When desired to roast smaller pieces of food item such as fish, maize, etc., it is preferred to use the roasting frame 5 (see FIG. 8). If large piece of food item such as a hen is to be roasted, it is preferred to use the roasting bar so that the hen will be rotated when the motor is switched on thereby enabling the hen to be roasted evenly without manual operation.

Although this invention has been described with a certain degree of particularity, it is understood that the present disclosure has been made by way of example only and that numerous changes in the detail of construction and the arrangement and combination of parts may be resorted to without departing from the spirit and scope of the invention as hereinafter claimed.

I claim:

1. A collapsible camp stove that folds into a self-contained substantially rectangular package comprising:

a folding casing, composed of a rectangular receptacle, a front panel formed at each vertical side with a hole in which is slidably mounted a fastener, a rear panel formed at vertical side with two holes in each of which is slidably mounted a fastener, and two side panels each formed at the top with notches and at the vertical side with a flange having a locking hole which is positioned such that said side panels are connected when put together respectively with said front panel and said rear panel and said fasteners slidably mounted in the holes of said front panel and said rear panel are moved downwards, such that said side panels disconnect from said front panel and said rear panel when said fasteners slidably mounted in the holes of said front panel and said rear panel are moved upwards allowing said folding casing to be folded into a compact case, each said side panel being provided at the inner surface with an upper rail and a lower rail and at the top edge with a plurality of notches, said rectangular receptacle being fitted in the front with an air baffle for controlling air flow entering into said folding casing for combustion of fuel therein and further provided in the bottom with four socket members;

four leg members, each engageable with one of said four socket members of said rectangular receptacle;

two grips, each engageable with one of said two side panels;

a grate disposed in said folding casing for supporting burning fuel within and above inside bottom surface of the receptacle of said folding casing;

a roasting frame having a holding member movably mounted thereto so that said holding member can be moved out to act as a handle, said roasting frame being adapted to be supported by said upper rails or said lower rails of the side panels of the folding casing for supporting food items at a predetermined height above the burning fuel;

two laterally spaced pairs of cooperating fastening devices secured to outer surface of said front panel and outer surface of said rear panel, respectively, to permit a securement of said side panels, said front panel and said rear panel in closed position over open top of said receptacle; and a plurality of roasting rods adapted to be supported by the notches of the side panels of said folding casing, said roasting rods being engageable with a motor at one end so that said roasting rods will be rotated when said motor is turned on.

* * * * *